(12) United States Patent
Hsu (10) Patent No.: US 12,373,529 B2
(45) Date of Patent: Jul. 29, 2025

(54) SYSTEMS AND METHODS FOR IDENTITY AUTHENTICATION USING TOKENIZED BIOMETRIC IDENTIFICATION

(71) Applicant: Idemia Identity & Security France, Courbevoie (FR)

(72) Inventor: Rein-Lien Hsu, Edison, NJ (US)

(73) Assignee: IDEMIA Public Security France, Courbevoie (FR)

( * ) Notice: Subject to any disclaimer, the term of this patent is extended or adjusted under 35 U.S.C. 154(b) by 268 days.

(21) Appl. No.: 18/325,758

(22) Filed: May 30, 2023

(65) Prior Publication Data

US 2024/0403399 A1  Dec. 5, 2024

(51) Int. Cl.
| | | |
|---|---|---|
| *G06F 21/36* | (2013.01) | |
| *G06F 21/32* | (2013.01) | |
| *G06F 21/51* | (2013.01) | |
| *G06F 21/60* | (2013.01) | |
| *G06F 21/41* | (2013.01) | |

(52) U.S. Cl.
CPC .............. *G06F 21/32* (2013.01); *G06F 21/36* (2013.01); *G06F 21/51* (2013.01); *G06F 21/602* (2013.01); *G06F 21/41* (2013.01)

(58) Field of Classification Search
USPC .......................................... 709/220, 224–228
See application file for complete search history.

(56) References Cited

U.S. PATENT DOCUMENTS

| | | | |
|---|---|---|---|
| 10,084,782 B2 * | 9/2018 | Rolfe | H04L 63/0884 |
| 10,154,029 B1 * | 12/2018 | Griffin | H04L 63/06 |
| 10,469,487 B1 * | 11/2019 | Griffin | H04L 63/0861 |
| 10,778,450 B1 * | 9/2020 | Griffin | H04L 9/0844 |
| 10,810,290 B2 * | 10/2020 | Minter | G06F 21/64 |
| 11,139,964 B1 * | 10/2021 | Griffin | H04L 9/50 |
| 11,361,532 B1 | 6/2022 | Martin et al. | |
| 11,405,387 B1 * | 8/2022 | Griffin | H04L 9/0866 |
| 11,436,597 B1 * | 9/2022 | Griffin | H04L 9/3213 |
| 2017/0236355 A1 | 8/2017 | Chabanne et al. | |
| 2018/0091505 A1 * | 3/2018 | Farrell | H04L 63/062 |
| 2019/0028468 A1 * | 1/2019 | Garcia | G06V 10/95 |
| 2019/0373137 A1 | 12/2019 | Krukar et al. | |
| 2020/0014541 A1 * | 1/2020 | Streit | H04L 63/0861 |
| 2020/0228336 A1 * | 7/2020 | Streit | H04L 9/3231 |

(Continued)

FOREIGN PATENT DOCUMENTS

WO  WO-2008036126 A2 *  3/2008 ............ H04L 63/08

OTHER PUBLICATIONS

P.A. Grassi et al, "Digital Identity Guidelines," NIST Special Publication 800-63A, Jun. 2017. < https://doi.org/10.6028/NIST.SP.800-63a>.

(Continued)

*Primary Examiner* — Khanh Q Dinh
(74) *Attorney, Agent, or Firm* — Armstrong Teasdale LLP (57) ABSTRACT

Methods and systems for authenticating identity credentials are provided. An identity credential is proofed and issued with biometric and enrollment data, as well as a graphical seal. The identity credential is later presented for authentication, and the seal is used to access the biometric and enrollment data. Live biometric and identification data are compared to the identity credential, and the identity credential may be authenticated.

14 Claims, 7 Drawing Sheets

(56) References Cited

U.S. PATENT DOCUMENTS

2021/0141896 A1\* 5/2021 Streit .................. G06F 21/32
2021/0243027 A1 8/2021 Gupta

OTHER PUBLICATIONS

"Electronic Identification" < https://en.wikipedia.org/wiki/Electronic_identification>.
Idemia Mobile ID <https://idemia-mobile-id.com/>.
Apple eID-Me Digital ID <https://apps.apple.com/ca/app/eid-me-digital-id/id1260676454>.
"What is Blockchain technology?" <https://www.ibm.com/topics/what-is-blockchain >.
A. Sarkar, "Integrating blockchain-based digital IDs into daily life". < https://cointelegraph.com/news/integrating-blockchain-based-digital-ids-into-daily-life>.
Decentralised identity <https://www.gsma.com/identity/decentralised-identity >.
Orchestra by Vision Box <https://www.vision-box.com/solutions/orchestra>.

\* cited by examiner

SYSTEMS AND METHODS FOR IDENTITY AUTHENTICATION USING TOKENIZED BIOMETRIC IDENTIFICATION

FIELD

The field of the disclosure relates generally to identity credential authentication and, more particularly, to authenticating an identity credential using tokenized biometric information.

BACKGROUND

The use of digital credentials continues to increase in diverse digital environments and applications, as has the need to verify or authenticate these digital credentials when they are used. Likewise, requirements for verification or authentication of various other digital documents and digital representations of physical documents have increased in number and complexity over time. The demand for authentication schemes with improved confidence and data freshness has risen in turn.

It is also increasingly common to provide a digital representation, duplication, or "copy" of a physical document. For example, digital or mobile driver's licenses and other digital, mobile, and/or electronic identity documents have been introduced. These digital documents may improve accessibility of these identity documents, but, as noted, they can also be susceptible to fraud or manipulation, which may reduce their efficacy. For example, certain governmental or security entities may not accept digital forms of identity documents as there can be uncertainty regarding the authenticity of such a digital document.

It is known to enable more secure presentment of digital documents via digital wallets, which can facilitate document proofing and enrollment within their service ecosystems. However, while these wallet-based digital documents may have enhanced security, they are tied to that wallet environment. That is, a specific instance of a device or app must be used to store and access the digital document, which can reduce the usability and accessibility of the document.

It is therefore desirable to have a digital credential presentment and authentication scheme, with a strong level of security and confidence associated therewith, while also enabling credential access across devices and applications.

SUMMARY

In one aspect, an identity credential authentication (ICA) computing device is provided, the ICA computing device including a processor communicatively coupled to a memory. The ICA computing device is configured to receive enrollment data associated with an identity credential to be issued and an initial biometric sample associated with a credential owner of the identity credential. The ICA computing device is also configured to encrypt the received enrollment data and initial biometric sample, generate a graphical seal encoding the encrypted data, and store the encrypted data in a storage location, wherein the storage location is accessible using the graphical seal. The CDA computing device is further configured to initiate application of the graphical seal to the identity credential upon issuance of the identity credential.

In another aspect, an identity credential authentication (ICA) computing device is provided, the ICA computing device including a processor communicatively coupled to a memory. The ICA computing device is configured to receive an image of an identity credential presented for authentication, the image of the identity credential depicting a graphical seal applied to the identity credential, and receive a live biometric sample from a credential owner of the identity credential. The ICA computing device is also configured to decode enrollment data and an initial biometric sample encoded in the graphical seal, extract live identification data from the image of the identity credential, compare the live identification data to the enrollment data, and compare the live biometric sample to the initial biometric sample. The ICA computing device is further configured to authenticate the identity credential based on an outcome of the comparisons.

DETAILED DESCRIPTION

The disclosed systems and methods provide for improved authentication of credentials, in particular, identity credentials and associated credential documents. As described further herein, the disclosure is directed to two phases of an overall identity credential authentication scheme: credential proofing and provisioning (or issuance) with a link to tokenized biometric information, and subsequent credential authentication in which live biometrics are compared to the tokenized biometric information.

Non-fungible tokens (NFTs) are based on blockchain technology and are unique digital identifiers that cannot be copied, changed, or subdivided and that are hard to be forged. Therefore, blockchain-based NFTs are suitable for certifying authenticity and ownership of identity credentials. The systems and methods disclosed herein enable non-fungible or tokenized biometric identification authentication. In some example embodiments, biometric samples are proofed and encoded within an NFT that is owned by the credential owner and applied to an identity credential via a graphical seal or alphanumeric identifier. The authentication history of the identity credential is also tracked and stored in the NFT, enabling the identification of verification trends and fraud attempts.

The use of tokenization and blockchain technology enables linking physical and digital versions of an identity credential and the use of both versions as authenticated and authenticatable credentials, because the ownership and authenticity of a token-sealed identity credential can be verified. In particular, because the physical and digital versions are so linked, the identity credential can be authenticated and accessed using the physical version alone, the physical version with the digital version, or the digital version alone, in physical and digital authentication transactions, using live biometrics as a source for identity authentication.

Figure 1:
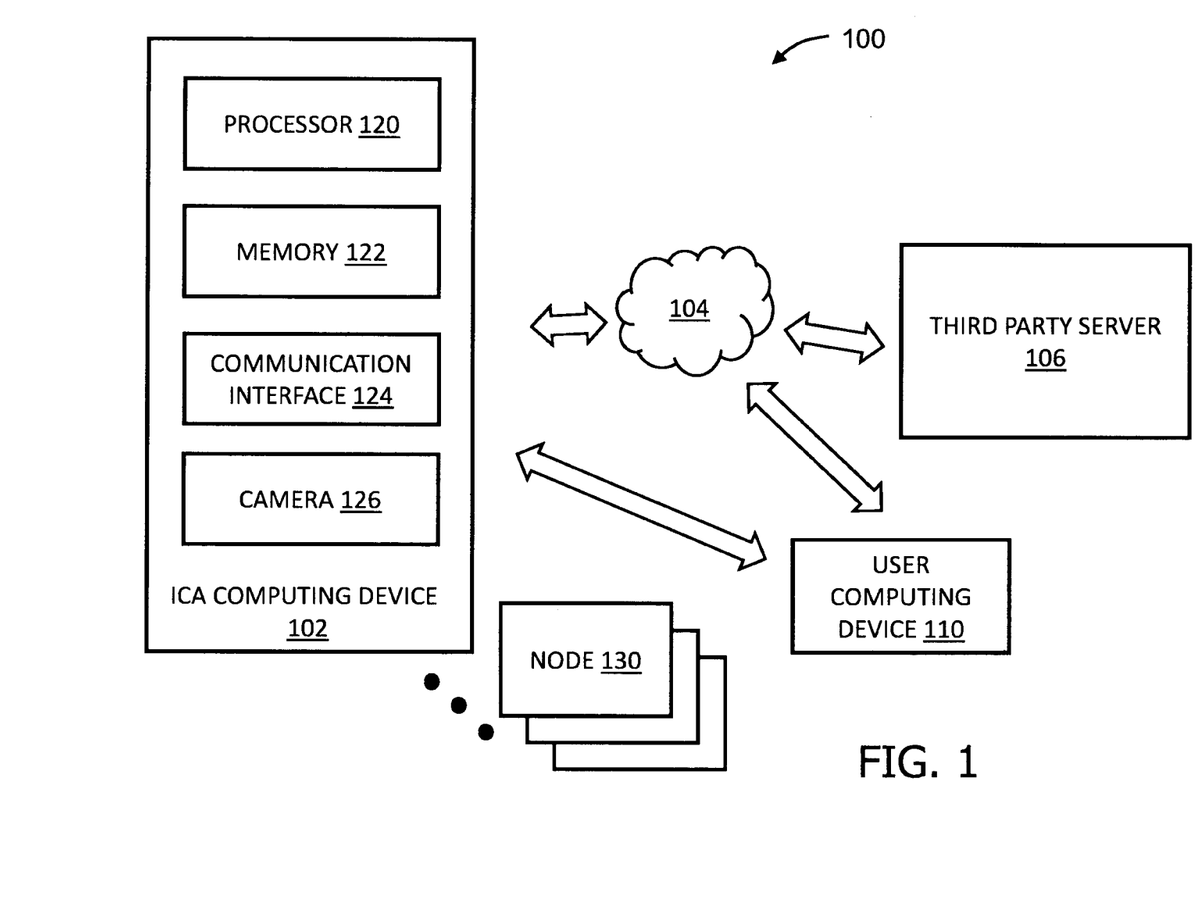
FIG. 1 is a schematic diagram of an example credential authentication system in accordance with the present disclosure.

Turning now to the drawings, FIG. 1 is a schematic diagram of an example credential authentication system 100 that may be used to implement the various functions described herein. The authentication system 100 includes an identity credential authentication (ICA) computing device 102, also referred to as an ICA server. The ICA computing device 102 includes a processor 120 and a memory 122. The processor 120 executes instructions stored on the memory 122 to implement one or more processes, or portions of processes, for identity credential enrollment, provisioning, and/or authentication. The ICA computing device 102 also includes a communication interface 124, for communicating with other devices (e.g., third-party servers 106, user computing devices 110, node computing devices 130, etc.) over a network 104. The communication interface 124 may be any wired and/or wireless communication interface that facilitates communication among computing devices over the network 104, which may include a wide-area-network, a local-area-network, the internet, and/or any other collection of networked computing devices. In some embodiments, the communication interface 124 may also facilitate wireless communications using any of a variety of wireless protocols, such as WiFi, BLUETOOTH, cellular, NFC, and/or other protocol(s) in the radio frequency (RF) spectrum. Although one ICA computing device is shown in FIG. 1, credential authentication system 100 may include and employ more than one ICA computing device to perform the steps and processes discussed herein.

The credential authentication system 100 also includes one or more third-party computing devices 106 (also referred to as third-party servers). The ICA computing device 102 is communicatively coupled to the third-party servers 106 via the network 104. The third-party servers 106 may include, for example, authorities responsible for issuing identity credentials (e.g., governmental entities or other validated issuing entities). The third-party servers 106 may also be associated with authentication requesting parties, or data sources of enrollment data or identification data. The ICA computing device 102 may also be communicatively coupled to one or more user computing devices 110. The user computing devices 110 are computers including a web browser or a software application enabling the user computing devices 110 to access the ICA computing device 102 via the network 104 using, for example, the Internet.

The ICA computing device 102, third-party servers 106, and/or user computing devices 110 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, or other web-based connectable equipment or mobile devices. In some embodiments, the third-party servers 106 and/or user computing devices 110 are capable of requesting and/or accessing information from or providing information to the ICA computing device 102 (e.g., providing identity credentials or images of credentials; requesting container files; etc.).

The credential authentication system 100 also includes one or more node computing devices 130. The node computing devices 130 may be similar to the ICA computing device 102, third party servers 106, and/or user computing device 110. Broadly, the node devices 130 may be any computer device capable of maintaining a distributed electronic ledger (e.g., a blockchain). The ICA computing device 102, as described herein, is also capable of maintaining a distributed electronic ledger and may be considered a node computing device of the overall credential authentication system 100.

Figure 2:
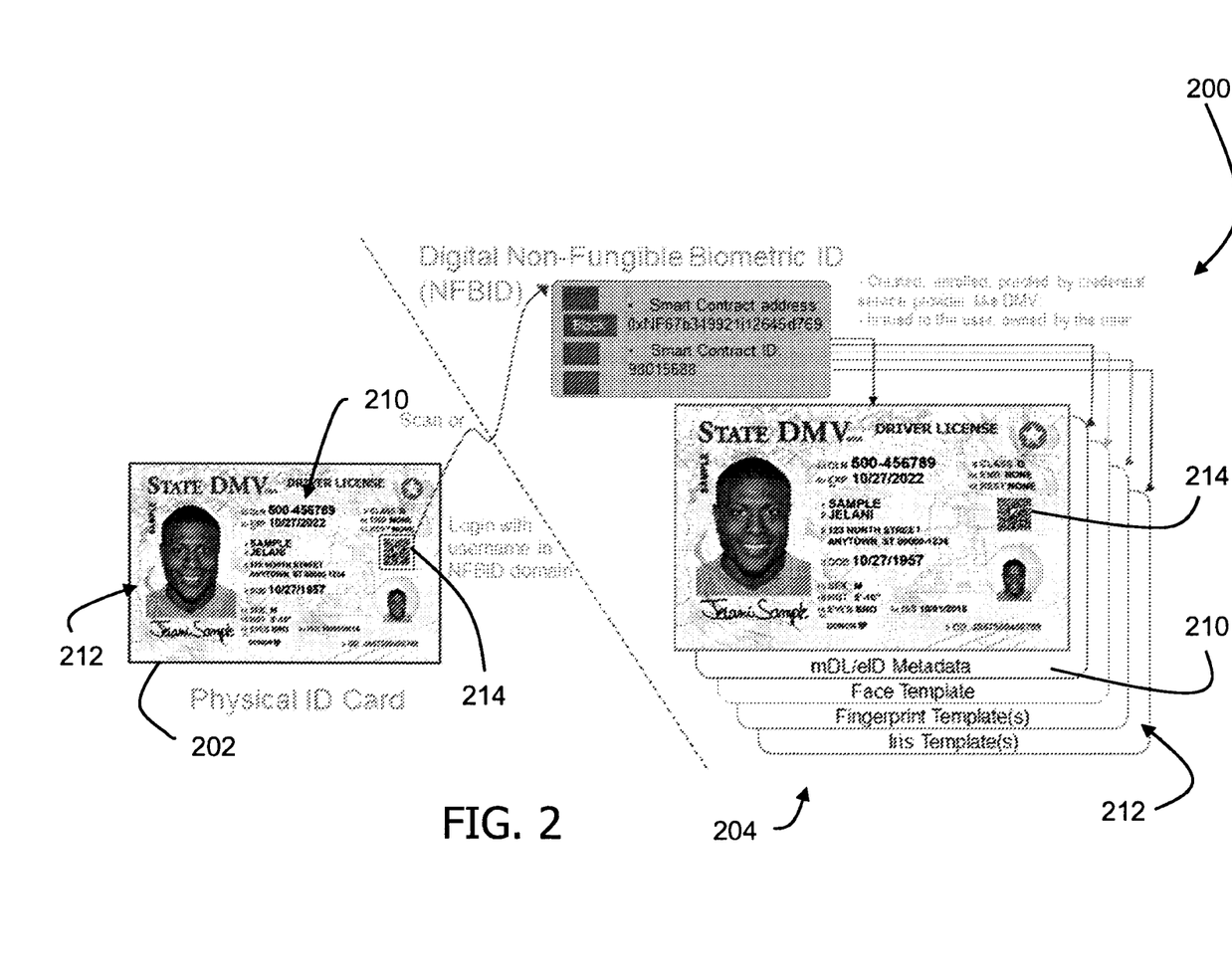
FIG. 2 depicts an identity credential, including linked physical and digital versions thereof.

With reference now to FIG. 2, an exemplary identity credential 200 is illustrated. On the left side of FIG. 2 is depicted a physical version of the identity credential 200, referred to as the physical identity credential or physical credential document 202, and the right side of FIG. 2 depicts a digital version of the identity credential 200, referred to as the digital identity credential or digital credential document 204.

As used herein, the term "identity credential," "user credential," "credential," or "credential document" (referred to using reference numeral 200) may include any form of identity credential, credential document, identification, or other documentation associated with a user that may be used to identify the user. For example, in at least some embodiments, identity credentials 200 may include any form of photo identification (photo ID), such as a driver's license, passport, or other government or non-government issued photo ID. While this disclosure provides examples relative to government-issued identity credentials 200, the systems and methods are equally applicable to privately issued identity credentials 200, such as identification badges and the like. Likewise, in some embodiments, identity credentials 200 may include transaction instruments, such as payment cards (e.g., credit and debit cards). In some embodiments, identity credentials 200 may include permissions and privileges (e.g., "driving privilege" or "right to hunt/fish in a specific location"). For example, data shared from an identity credential 200 may be data received from one or more issuing authorities. As an example, data associated with and/or stored in the identity credentials 200 may be received from a Department of Motor Vehicles (DMV) or medical facility. For instance, the data associated with and/or stored in the identity credentials 200 may include DMV portrait, DMV first name, DMV last name, DMV document number, Hospital driver license number, Hospital first name, Hospital last name, Hospital covid-19 vaccine name, Hospital covid-19 vaccination date.

Additionally, as used herein, the term identity credential 200 refers both to a physical identity credential and to a digital version of a physical identity credential, such as a mobile ID provisioned by a validated issuing authority. The digital version of the physical identity credential may additionally or alternatively include an image of a physical credential document captured using a camera, scanner, or other imaging (e.g., a digital image, an electronic document, such as a text or PDF document, etc.). The "physical" or "digital" modifier is used herein where such a distinction is necessary or is helpful for the clarity of the discussion. Specifically, a "physical identity credential" 202 and a "digital identity credential" 204 refer to the physical and digital versions, respectively, of a same identity credential 200 (e.g., a driver's license).

In the present disclosure, the digital identity credential 204 is not a device-specific or app-specific instance. Rather, the digital identity credential 204 is created and stored in a universally accepted or standardized format, such that the digital identity credential 204 can be accessed and presented using virtually any computing device (e.g., user computing devices 110). In some cases, the digital identity credential 204 may have a standard image or digital file format (e.g., PDF), because the authenticity of the underlying identity credential is robustly authenticated using the systems and methods described herein. Stated differently, the particular format of the identity credential 200 is not essential because the authentication process ensures that any presentment of the digital identity credential 204 (or, indeed, the physical identity credential 202 or a copy thereof) is authenticatable using data intrinsic and extrinsic to the identity credential 200, regardless of the format of the identity credential 200.

The identity credential 200 includes identification data 210 that functions to identify the credential user as well as the identity credential itself. For example, the identification data 210 includes personally identifiable information (PII) of the credential user, such as a name, date of birth, address, residence, citizenship, sex, eye color, height, weight, etc. The identification data 210 also includes credential-specific data, such as a document reference number (e.g., passport number, driver's license number, visa number, etc.), a credential issuance date, a credential expiration date, and the like. The identity credential 200 may also include some intrinsic biometric data 212, such as an image of the credential user, a signature of the credential user, and the like.

The identity credential 200 also includes a credential seal 214. As described further herein, the credential seal 214 is applied to the identity credential 200 when the identity credential 200 is issued by the issuing authority or a new version thereof is issued (e.g., a digital identity credential corresponding to an existing physical identity credential). Broadly, the credential seal 214 functions as a link to the data used to authenticate the identity credential 200, as described further herein. Although details of the credential seal 214 are provided herein, additional description of the credential seal 214 can be found in the co-pending U.S. patent application Ser. No. 18/325,723, entitled DIGITAL DOCUMENT SEAL, filed May 30, 2023).

Figure 3:
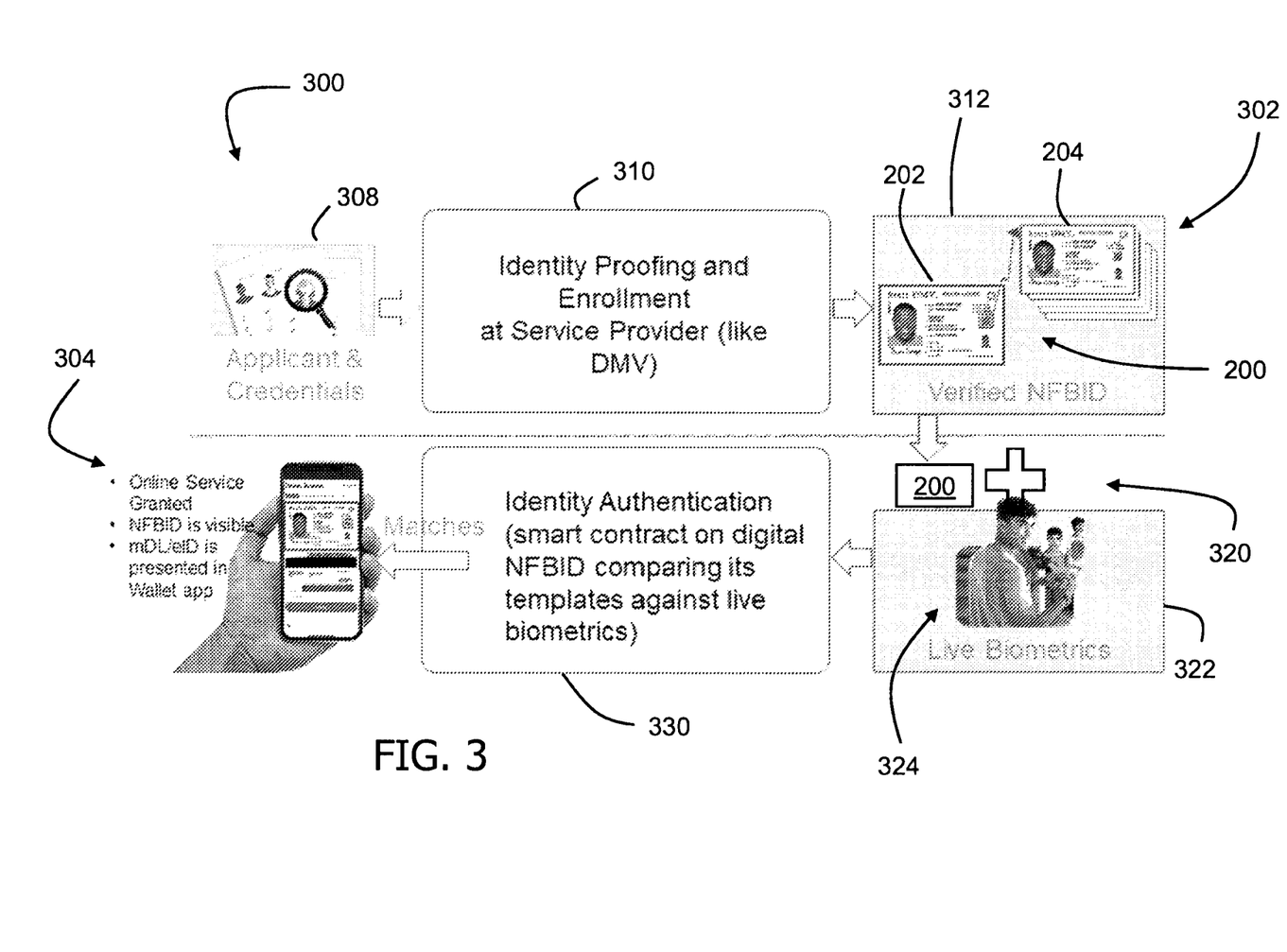
FIG. 3 is a flow diagram of a two-part identity credential authentication procedure including a credential proofing and provisioning phase and a credential authentication phase.
Figure 4:
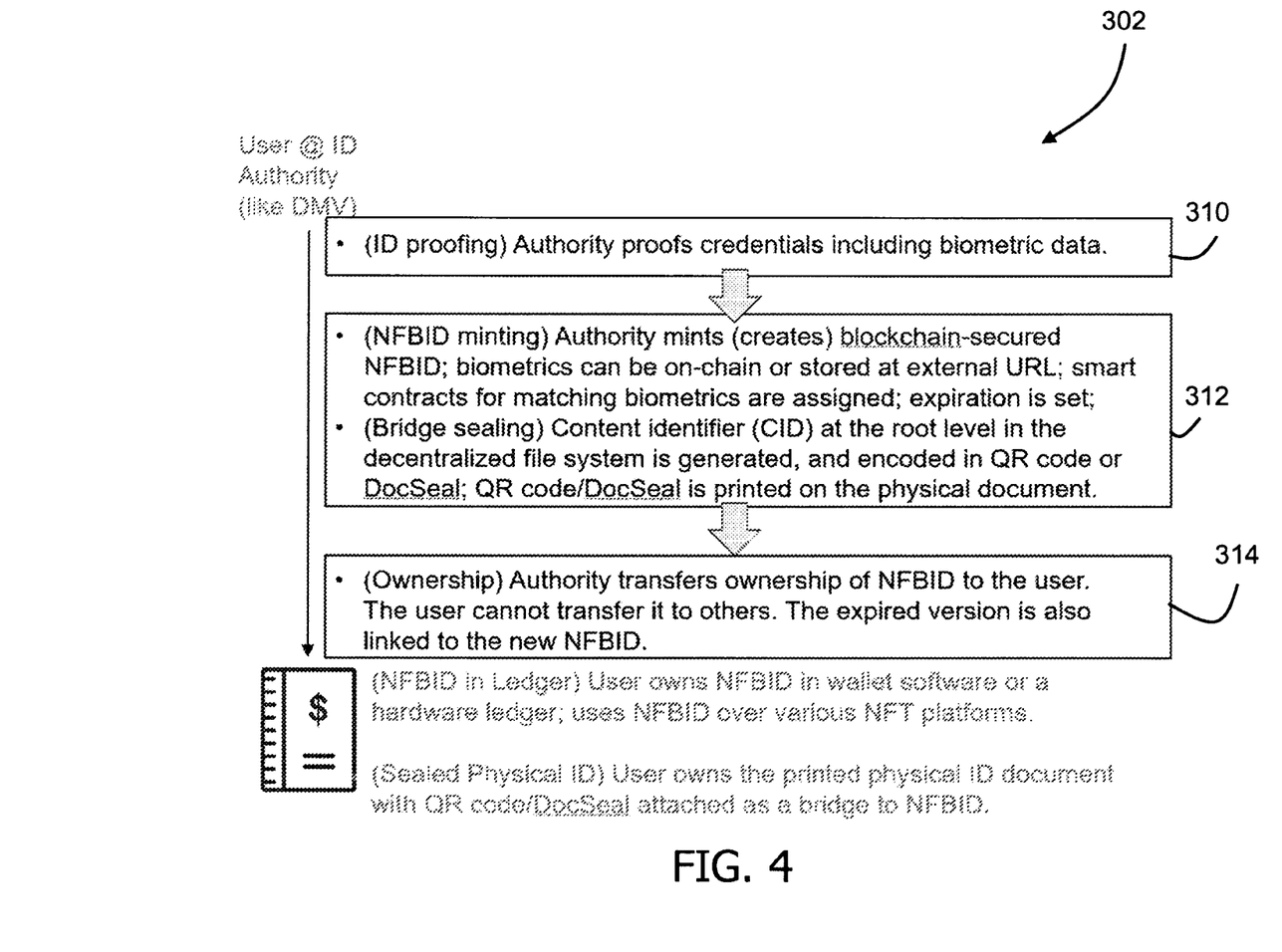
FIG. 4 is a schematic flow diagram of the credential proofing and provisioning phase of the identity credential authentication procedure.
Figure 6:
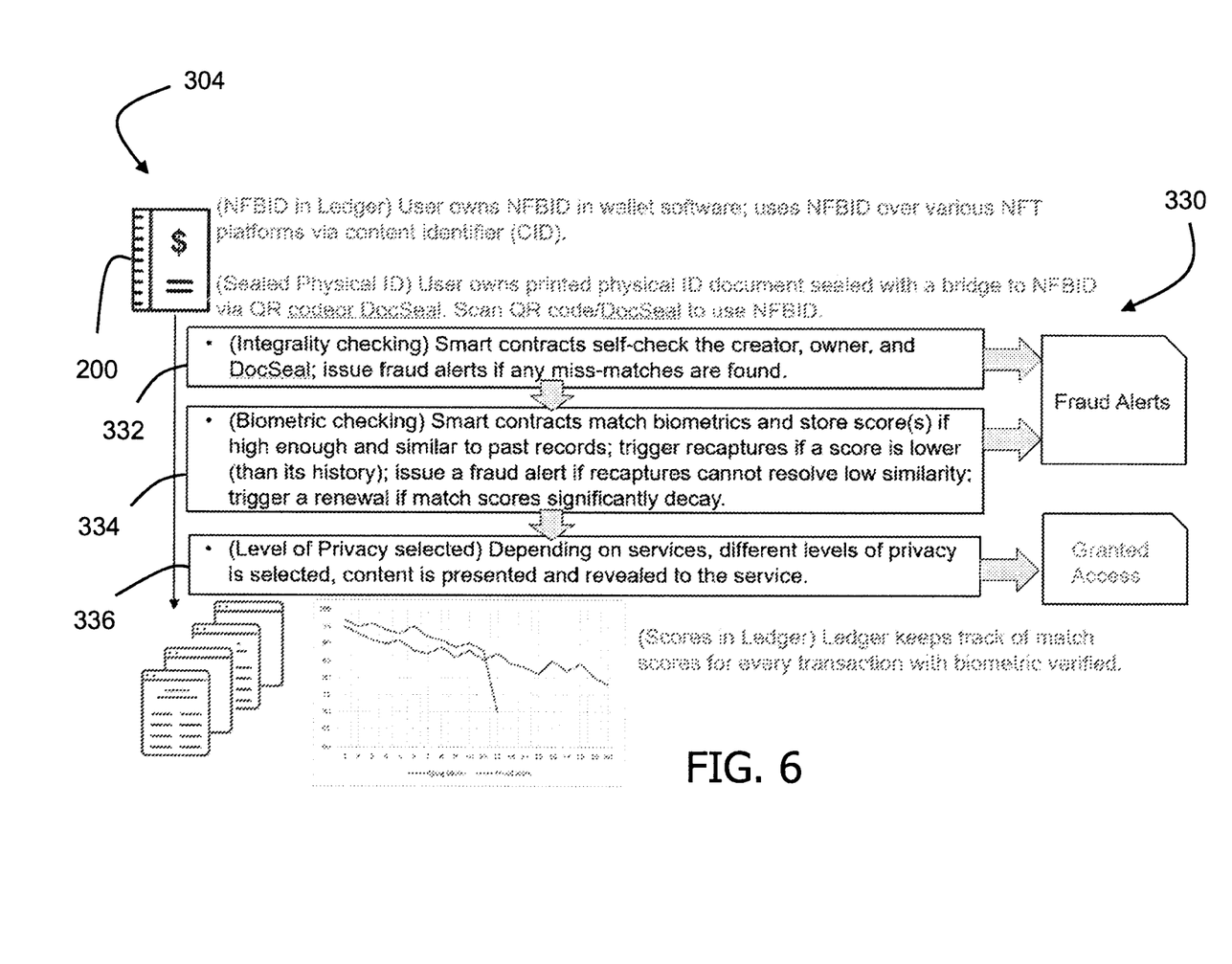
FIG. 6 is a schematic flow diagram of the credential authentication phase of the identity credential authentication procedure.

Turning to FIG. 3, a flow diagram of a two-part credential authentication procedure 300 in accordance with the present disclosure is shown, the procedure 300 including a first phase, referred to as a proofing and provisioning phase 302, and a second phase, referred to as an authentication phase 304. FIG. 4 depicts a more detailed flow diagram of the proofing and provisioning phase 302, and FIG. 6 depicts a more detailed flow diagram of the authentication phase 304.

Broadly, the proofing and provisioning phase 302 refers to the process of issuing or provisioning an identity credential 200 to a user (e.g., a credential owner). In one example embodiment, some of the steps of the proofing and provisioning phase 302 may be implemented by an issuing entity, such as, but not limited to, a DMV or other governmental authority (e.g., as represented in FIG. 1 by a third-party server 106), and some of the steps may be implemented by the ICA computing device 102.

A person—also referred to herein as a user or credential owner—interfaces with the issuing entity to request (308) an identity credential 200. The user may interact with one or more other people and/or computing devices (e.g., third-party servers 106), directly or indirectly, that are associated with the issuing entity to make such a request. In many cases, the user provides various documentation or attestation regarding their identity. The issuing entity performs one or more proofing steps (310), in accordance with their various preferences, processes, regulations, etc., to verify the identity of the user. The issuing entity then initiates the provisioning (312) of an identity credential 200 to the user.

In the example embodiment, before or during this provisioning (312), the user provides one or more biometric samples 212 (see FIG. 2) to the issuing entity. The biometric samples 212 can include, but are not limited to, a portrait image for facial recognition, a fingerprint, a voice capture, a template of a person's iris for optical recognition, a signature, which may be captured previously or during the proofing or provisioning steps (310, 312). The issuing identity and/or the ICA computing device 102 stores and encodes (e.g., encrypts) the biometric sample 212 as an authentication sample, or template, for future comparison. In some cases, the issuing identity and/or the ICA computing device 102 also stores and encodes (e.g., encrypts) identification data 210 (see FIG. 2) associated with the identity credential 200 being provisioned (312), such as a document reference number, a credential expiration date, PII, etc. This biometric data 212 and identification data 210 compiled during the initial proofing and provisioning phase 302, may be referred to herein as first, or initial, biometric data 212 and enrollment data (or initial identification data) 210, respectively.

A credential seal 214 is generated based on the encoded biometric data and/or the encoded enrollment data. In particular, the seal 214 is generated as a visible graphic containing random dots encoding the enrollment data and initial biometric data (or a link thereto) therein. In one embodiment, the issuing entity communicates (e.g., over the network 104, such as via an API call) with the ICA computing device 102 to request the seal 214. The ICA computing device 102 generates the seal 214 based on the biometric data 212 and enrollment data 210. The ICA computing device 102 generates the seal 214 as a visible graphic that encapsulates or encodes the initial biometric data 212 and the enrollment data 210 (e.g., PII, expiration date, or other data unique to the identity credential 200). The graphic or symbol forming the seal 214 may have virtually any design, including a structured design like a QR code or bar code, or any arbitrary shape. In other embodiments, the issuing entity may generate the seal 214.

In some embodiments, in which the ICA computing device 102 generates the seal 214, the ICA computing device 102 compiles and stores the initial biometric data 212 and the enrollment data 210 at a storage location in a local, remote, or distributed memory (e.g., memory 122). The generated seal 214 encodes a link to the storage location. The ICA computing device 102 also stores a matching algorithm, or a link thereto, in the storage location. The matching algorithm enables matching of an authentication input or sample to the initial biometric data 212 during authentication of the identity credential 200.

In some embodiments, in which the ICA computing device 102 generates the seal 214, the ICA computing device 102 compiles and encrypts the initial biometric data 212 and enrollment data 210, and stores this encryption in a container file of an electronic ledger. In some cases, the ICA computing device 102 also stores a matching algorithm in the container file. Additionally or alternatively, the ICA computing device 102 stores, in the container file, smart contracts for automatically executing the matching algorithm upon successful access to (e.g., decryption of) the container file. In some instances, the ICA computing device 102 stores a link to the matching algorithm in the container file, such that the link is accessible upon successful access to the container file. The container file may also include a decryption key or a link thereto. The ICA computing device 102 generates a non-fungible token (NFT) for the identity credential 200 based on the data stored in the container file. The generated seal 214 encodes a link to the container file and, therefore, to the NFT. The ICA computing device 102 stores the container file and NFT in a cloud-based electronic ledger (e.g., a blockchain) for secure, immutable storage. In some embodiments, the ICA computing device 102 may push or transmit container files and/or NFTs to other node devices 130 maintaining the electronic ledger. The ICA computing device 102 may additionally store the container files and/or NFTs on any other cloud-based storage device, such as one or more databases. Notably, the owner of the NFT and the container file is recorded as the user or credential owner, not the provisioning entity (e.g., the ICA computing device 102 or the issuing entity) (see step 314, FIG. 4). Ownership of the NFT and container file is non-transferable, enhancing the security of the authentication system 100 by ensuring the identity credential 200 cannot be authenticated except by the (initial, proofed) user or credential owner.

Notably, the NFTs described herein may be formatted and stored as a unique data structure, which stores standardized, secured (e.g., encrypted) data associated with the identity credential, in a readily retrievable format that enhances the efficiency, security, and reliability of credential authentication systems 100. Additionally, in one example embodiment, the ICA computing device 102 securely stores container files that are accessible via cloud-based networks and devices, for improved accessibility to the associated NFTs.

In some embodiments, the seal 214 is generated with an expiration date at which the seal 214 expires, or is no longer functional to authenticate the identity credential 200. In some cases, the expiration date is the same as an expiration date of the identity credential 200 itself. In other cases, the expiration date is pre-defined as another interval of time (e.g., one year, sixteen months, two years, five years, etc.), regardless of any expiration date (or lack thereof) of the identity credential 200.

The generated seal 214 is applied to the identity credential 200 when the identity credential 200 is issued or provisioned (312) to the user, now referred to as the credential owner. As explained further herein, the seal 214 enables equivalent access and usability to both physical and digital identity credentials for authentication of a user's identity. Therefore, a user has simplified access to a digital identity credential that can function with a same level of confidence to authenticate a user's identity.

In some embodiments, the identity credential 200 includes a physical version 202, and the seal 214 is applied physically by printing, etching, or otherwise marking the seal 214 directly on the physical credential document 202. The (sealed) identity credential 200 is physically provided to the credential owner. In some cases, the seal 214 can be applied at some subsequent time to an existing physical identity credential 202, as part of an upgrade process or when a digital version 204 of the identity credential 200 is requested and issued, for example. That is, the systems and methods are not limited only to an initial issuance or printing of a physical identity credential 202.

In the example embodiment, the identity credential 200 includes a digital version 204, which may be a copy or scan of a corresponding physical identity credential 202 or may be generated simultaneously as a discrete digital file (e.g., an image file, PDF, or some other standardized format file accessible across devices and applications) with or without a corresponding physical version. The digital identity credential 204 is provided to the credential owner via their user computing device 110. The digital identity credential 204 may be sent to the user computing device 110 of the credential owner by the issuing entity or by the ICA computing device 102 (e.g., over the network 104). The seal 214 may be applied to the digital identity credential 204 as part of a digital file forming the digital identity credential 204 (e.g., upon initial issuance of the digital identity credential 204), or by digitally modifying an initial version of the digital file forming the digital identity credential 204, with an image layer including the seal 214. Therefore, when the digital identity credential 204 is later presented on the user computing device 110, the credential 204 includes the seal 214 upon presentment. In other words, the seal 214 is embedded in the same file as the digital identity credential 204. In an alternative embodiment, the seal 214 may be a separate file (e.g., a seal file) associated with the digital identity credential 204 and stored locally at the user computing device 110 and separate from the file containing the digital identity credential 204. When the digital identity credential 204 is later presented for authentication, the seal file is also accessed, and accessing the seal file causes the seal 214 to be overlaid on the displayed digital identity credential 204. Storing the seal file separately may improve the security of the sealed digital identity credential 204, because both the seal file and the credential file would need to be accessed to manipulate either file.

The seal 214 functions as a bridge or link between a physical identity credential 202 and the digital identity credential 204. More specifically, the seal 214 enables functional equivalence between the physical and digital versions (202, 204, respectively) of the identity credential 200, because either version can be authenticated in a same manner, to authenticate the identity of the credential owner. Moreover, the seal 214 links a digital identity credential 204 to a physical counterpart even if the physical counterpart is not sealed.

In some alternative embodiments of the present disclosure, the identity credential 200 may not include a graphical seal. Instead, the identity credential 200 may be provisioned with an alphanumeric content identifier (CID). The CID may be visibly applied to the identity credential 200 or may be otherwise provided to the credential owner separately from the identity credential 200 itself. In such cases, the CID would be provided (e.g., scanned or manually entered), rather than a graphical seal, for authentication of the identity credential 200. Accordingly, discussion herein of the functionality of the seal may apply to an alphanumeric CID, in some embodiments.

In one embodiment, where an identity credential 200 that has been issued or provisioned (312) according to the present disclosure has an expired seal 214, the owner of the identity credential 200 re-presents (308) the identity credential 200 for proofing (310), as described above. The identity credential 200 may then be re-sealed if the proofing (310) is successful. The seal 214 may have the same appearance, but the stored and encoded information (e.g., in a central storage location or an encrypted container file) is updated with a new expiration date. The ICA computing device 102 may push any updates of container files and/or NFTs to node computing devices 130, in response to any updates as described herein.

Where an identity credential 200 is updated or replaced upon expiration of the identity credential 200, the owner of the identity credential 200 presents (308) the updated or replacement identity credential 200 for initial proofing (310), as described above. Where the identity credential 200 itself has been changed (e.g., replaced or updated), a new instance of the identity credential 200 is issued and provided (312) to the credential owner, including a new physical version 202 and/or a new digital version 204 where applicable. This new instance is sealed as described above, where the new seal 214 encodes the new credential issuance and/or expiration date(s). In some cases, the initial biometric sample 212 may be re-used and encoded in the new seal 214; in other cases, a new biometric sample 212 is provided when the updated or replacement identity credential 200 is provisioned (312), and the new biometric sample 212 is encoded in the new seal 214.

Figure 5:
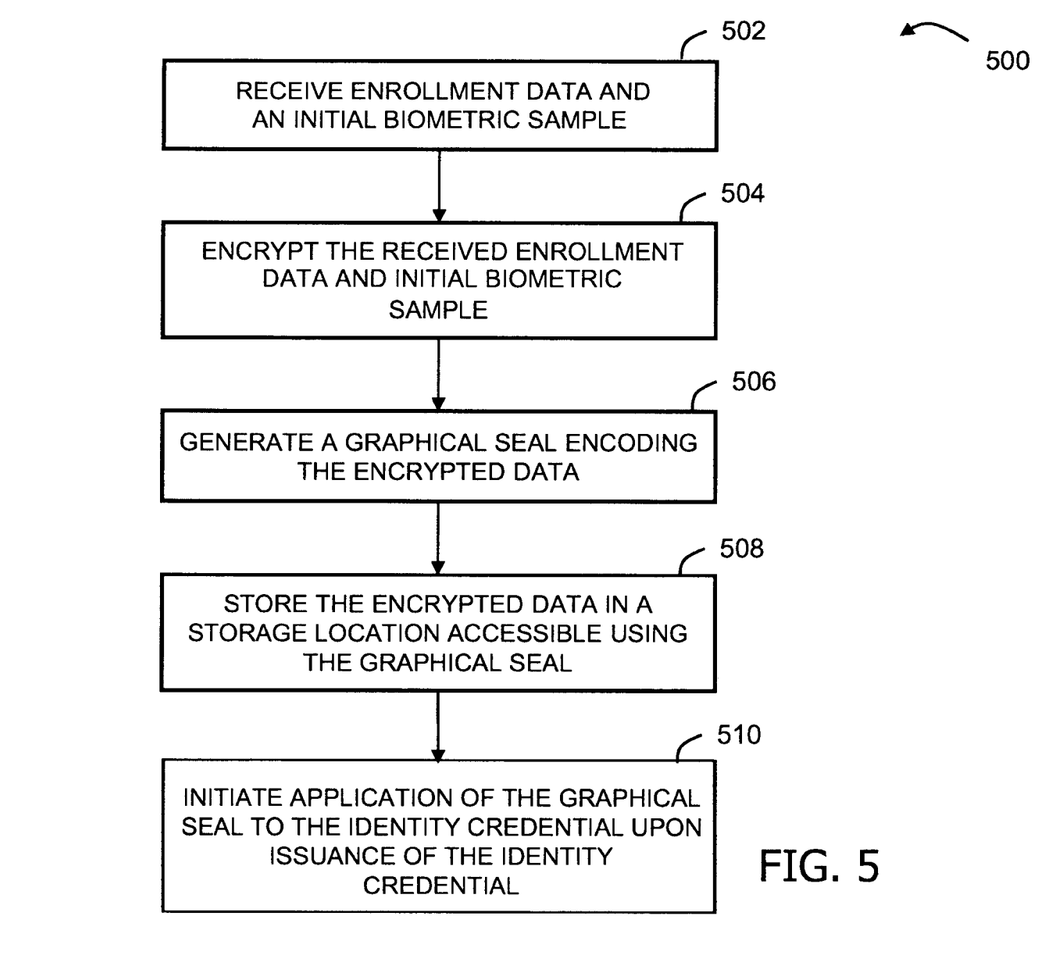
FIG. 5 is a flow diagram of a method of provisioning an identity credential.

FIG. 5 is a flow diagram of a method 500 of provisioning an identity credential in accordance with the present disclosure. Method 500 may be implemented using the credential authentication system 100 shown in FIG. 1, such as by the ICA computing device 102.

Method 500 includes receiving 502 enrollment data associated with an identity credential to be issued and an initial biometric sample associated with a credential owner of the identity credential, and encrypting 504 the received enrollment data and initial biometric sample. Method 500 also includes generating 506 a graphical seal encoding the encrypted data, and storing 508 the encrypted data in a storage location, wherein the storage location is accessible using the graphical seal. Method 500 further includes initiating 510 application of the graphical seal to the identity credential upon issuance of the identity credential.

Method 500 may include fewer, additional, and/or alternative steps.

For example, in some embodiments, initiating 510 includes applying the graphical seal to the physical and/or digital versions of the identity credential by the ICA computing device 102. In other embodiment, initiating 510 includes the ICA computing device 102 generating a command instruction for the issuing party (e.g., a third-party server 106) to apply the graphical seal, where the command instruction includes the graphical seal and computer-executable instructions that, when executed by the issuing party, cause the issuing party to apply the graphical seal (from the command instruction) to the identity credential.

In some embodiments, storing 508 the encrypted data comprises storing the encrypted data in a container file, and generating a non-fungible token (NFT) of the container file. In some embodiments, generating 506 the digital seal includes generating the digital seal including an encoded link to the container file. In some such embodiments, method 500 further includes encrypting a plurality of matching algorithms for matching a live biometric sample and presented identification data to the initial biometric sample and enrollment data, and storing the encrypted matching algorithms in the container file. Additionally or alternatively, method 500 may include storing a plurality of executable smart contracts for executing the plurality of matching algorithms in the container file. In some embodiments, method 500 further includes generating the NFT of the container file with an ownership record indicating the credential owner is an owner of the identity credential upon issuance of the identity credential. That is, the ownership of the identity credential is transferred to the user/credential owner from the issuing party, in some embodiments, after the creation of the NFT of the container file, after issuance of the identity credential.

In some embodiments, generating 506 includes generating the graphical seal including an expiration date of the graphical seal.

In some embodiments, initiating 510 includes initiating application of the graphical seal to a physical version of the identity credential as a physical graphical seal and to a digital version of the identity credential as a part of a digital credential file forming the digital version of the identity credential.

In some embodiments, initiating 510 includes initiating application of the graphical seal to a digital version of the identity credential by modifying an existing digital credential file forming the digital version of the identity credential In some embodiments, initiating 510 includes initiating application of the graphical seal to a digital version of the identity credential that corresponds to an existing physical version of the identity credential, by incorporating the graphical seal into a digital credential file forming the digital version of the identity credential.

With reference again to FIG. 3 and to FIG. 6, the ICA computing device 102 is configured to implement the identity authentication phase 304 as well. In the identity authentication phase 304, the identity credential 200 is presented (320) for authentication. In the context of the present application, authentication of the presented identity credential 200 refers to verification that the underlying credential has not been altered (fraudulently or otherwise) since it was provisioned and/or sealed, and that the presenter of the identity credential 200 is the legitimate user or owner of the identity credential 200.

A complete sequence of the identity authentication phase 304 may be referred to as a "transaction." Each transaction is initiated as a request for authentication of an identity credential 200. A successful transaction (which may be referred to as an "approval"), therefore, refers to a successful authentication of the identity credential 200. An unsuccessful transaction (which may be referred to as a "decline") refers to an unsuccessful authentication of the identity credential 200, in which in the authenticity of the identity credential 200—and, therefore, the identity of the credential owner—cannot be authenticated or verified.

In one example embodiment, the authentication request is initiated by the credential owner, by an operator of the ICA computing device on behalf of the credential owner, or by a third party (e.g., a requesting party). In some instances, the authentication request may be a signal transmitted to the ICA computing device 102. In other instances, the authentication request is initiated as a series of operations performed by an operator of ICA computing device 102 and/or a user computing device 110 of the credential owner. As part of the authentication request, the ICA computing device 102 is configured to receive an image of the presented identity credential 200. In one embodiment, the ICA computing device 102 includes an integrated image capture device, such as a camera 126 (as shown in FIG. 1), and captures the image directly. In another embodiment, the ICA computing device 102 is communicatively coupled to a discrete image capture device, such as a camera, or to another computing device with a camera, and receives the image therefrom.

Where the identity credential 200 is a physical identity credential 202 with the seal 214 applied directly thereto, the image may be a digital image or scan of the physical identity credential 202 as physically presented to the ICA computing device 102 (or to a user thereof). Where the identity credential 200 is a digital identity credential 204, the digital identity credential 204 is displayed on the screen of the user computing device 110 of the credential owner. The image of the digital identity credential 204 may be a photo or scan of the screen of the user computing device 110, on which the digital identity credential 204 is actively displayed.

Additionally, the ICA computing device 102 receives (322) a biometric sample from the credential owner, referred to herein as a live or current biometric sample 324. As used herein, the terms live, current, and/or real-time refer to data as it is presented during the process of credential presentment (320, 322), and therefore is live or current with respect to the corresponding authentication transaction. The ICA computing device 102 may include biometric sampling functionality or components, such as an image capture device to capture any biometrics within the identity credential 200 itself (e.g., a photo of the credential owner or a signature printed on the identity credential at provisioning), a facial scan or retinal scan of the credential owner, a fingerprint scanner, a microphone, etc. In such cases, the ICA computing device 102 captures the live biometric sample 324 directly. In another embodiment, the ICA computing device 102 is communicatively coupled to a discrete biometric sampling device, or to another computing device with biometric sampling capability, and receives the live biometric sample 324 therefrom.

In the example embodiment, the ICA computing device 102 is configured to authenticate (330) the presented identity credential 200 when the (stored, encrypted) initial data sets and the live data sets match, as described herein, for a live or in-person authentication request. In an alternative embodiment, authentication (330) of the identity credential 200 may be requested remotely, where a credential owner is not physically present at or near the ICA computing device 102 or an operator thereof. In such cases, the credential owner may still provide an image of the identity credential 200 and the live biometric sample 324 to the ICA computing device 102 over the network 104, and the ICA computing device 102 performs the authentication steps described herein. In some cases, the authentication request and associated data for matching are transmitted to the ICA computing device 102 by a third party service provider, requesting authentication (330) of an identity credential 200 being presented to the service provider by the credential owner. In some cases, the credential owner (or other requesting party) provides the CID of the identity credential, rather than a depiction of a seal, for authentication (330) of the identity credential 200.

The ICA computing device 102 identifies the seal 214 within the image of the presented identity credential 200 and proceeds to decode the information therein. In one example embodiment, the ICA computing device 102 decodes the seal 214, and accesses the link encoded therein. The link points to the storage location or container file including the initial biometric data 212 and enrollment data 210. Where the storage location is local or accessible using the network 104, the ICA computing device 102 retrieves the initial biometric data 212 and enrollment data 210 for subsequent processing. The retrieved data may also include one or more matching algorithms to be implemented by the ICA computing device 102, or a link thereto, such that the ICA computing device 102 is able to retrieve and access the matching algorithms. The ICA computing device 102 may cache the retrieved data in a local memory location, to improve processing efficiency.

Where the container file is located in a distributed electronic ledger, the ICA computing device 102 accesses the ledger (e.g., the blockchain) to retrieve the container file, which may include the NFT of the initial biometric data and enrollment data. The ICA computing device 102 decrypts the information in the container file (e.g., the NFT) to access and retrieve the initial biometric data 212 and enrollment data 210. The retrieved data may also include one or more matching algorithms to be implemented by the ICA computing device 102, which may be embodied as a smart contract that is automatically executed when accessed, or a link to the matching algorithm, such that the ICA computing device 102 is able to retrieve and access the matching algorithms. The ICA computing device 102 may cache the retrieved data in a local memory location, to improve processing efficiency.

The ICA computing device 102 executes or implements the accessed matching algorithm(s) and/or smart contract(s) as part of the authentication transaction. In an alternative, the ICA computing device 102 accesses a link to the matching algorithms, and such access causes a remote computing device to execute the matching algorithms on behalf of the ICA computing device 102.

In some embodiments, the ICA computing device 102 configured to extract live or current identification data from the presented identity credential 200, such as an expiration date, document identifier, or PII. The ICA computing device 102 may perform one or more extraction processes (e.g., image processing, OCR, text extraction, etc.) on the image of the identity credential 200 to extract the current identification data. In one exemplary embodiment, the ICA computing device 102 executes a first smart contract (also referred to as an "integrity contract") or matching algorithm to compare the live identification data to the enrollment data and/or metadata of the NFT (e.g., name, issuing entity, issue date, owner) during a first stage of the authentication phase 304, also referred to as an integrity checking stage or an ownership checking stage 332 (see FIG. 6). In some cases, the ICA computing device 102 accesses the NFT stored at two or more node computing devices 130 and performs the comparison of the identification data and enrollment data using the blocks stored at the node computing device 130 to ensure the match is fully accurate across the distributed network.

In some cases, where the seal 214 was generated to include an expiration date, the ICA computing device 102 will also compare the (decoded) expiration date of the seal 214 to a current date as part of the authentication transaction. If the expiration date has passed, in some cases, the ICA computing device 102 returns a result including a warning to the user that the seal 214 is expired. In some instances, the ICA computing device 102 may not authenticate an identity credential 200 after the seal 214 has expired. If the expiration date is within a certain threshold (e.g., the current date is less than one month before the expiration date of the seal), the ICA computing device 102 returns a result including a warning or alert to the credential owner that the expiration date is approaching.

When the first stage 332 is successful, the authentication phase 304 enters a second stage, referred to as a biometric checking stage 334. The ICA computing device 102 executes a second smart contract (also referred to as a "biometric contract") or matching algorithm to compare the initial biometric data and the live biometric sample. In the exemplary embodiment, the biometric contract identifies which sub-algorithms are available and/or applicable for matching any type of biometric sample, and automatically selects and executes one or more such sub-algorithms to perform the comparison of the initial biometric data and the live biometric sample.

The biometric contract returns or outputs a matching score based on the comparison. In some such cases, a higher matching score represents a higher level of matching and, optionally, a level of confidence in that level of matching. In some cases, the matching score is a tiered output (e.g., Tiers I-V), in which the tiers represent greater or lesser levels of matching and, optionally, the level of confidence. In some cases, a "match," for authentication purposes, may require a perfect or exact match between biometric samples. In other cases, a "match" may require that the matching score be above a certain threshold (e.g., 90%, 95%, 99%, for a quantitative score; Tier IV or V, for a qualitative or tiered score).

The ICA computing device 102 receives the matching score as the output from the smart contract(s) and/or matching algorithm(s) and stores or caches the output matching score associated with the current authentication transaction.

In some cases, the ICA computing device 102 may authenticate or not authenticate the identity credential 200, based on the single output matching score for the transaction. For example, where the identity credential 200 is being presented (320) for a first authentication transaction involving the identity credential 200, the matching score for that transaction may be the only relevant data point on which to base an authentication decision.

The ICA computing device 102 caches, or stores, the matching score and, in some cases, the authentication decision or outcome. Moreover, the ICA computing device 102 is configured to update the stored records associated with the identity credential 200, with the matching score and/or the authentication outcome. For example, the ICA computing device 102 generates a record of the transaction, including the score and/or outcome, and stores the record in the networked storage location where the initial data was stored. Where the data is stored in a blockchain, the ICA computing device 102 generates a record update, including the record of the transaction, and updates the blockchain associated with the identity credential 200. More specifically, the ICA computing device 102 updates the container file with the transaction record—including the matching score resulting from executing the matching algorithms—and re-hashes the container file to update the stored NFT. The ICA computing device 102 pushes the record updates to the node computing devices 130 with instructions to update their copies of the blockchain in the same manner. The ICA computing device 102 is configured to update the NFT every time an authentication transaction associated with the identity credential 200 is completed.

In this way, the NFT associated with the identity credential 200 also maintains an authentication history for the identity credential 200. The authentication history includes a time-based series or sequence of matching scores from a corresponding series of authentication transactions. Accordingly, in some embodiments, the ICA computing device 102, during an ongoing authentication transaction, compares a matching score for the transaction to the matching scores throughout the authentication history. In such a history-based score review, the relative change of scores as well as the comparison of a matching score with an absolute threshold can improve the robustness of biometric checking.

For a gradual trend of lowering matching scores, this occurrence can represent a change over time in the credential owner's biometric samples (e.g., the effect of aging or appearance change, relative to a photo of the credential owner at the time the identity credential 200 was provisioned). In some such cases, the ICA computing device 102 is configured to authenticate the identity credential 200 and also return an alert or recommendation to the credential owner to renew or update the identity credential 200 or the biometric sample 212 associated therewith. In some instances, the ICA computing device 102 can also store an instruction (e.g., in the container file) to decline any future authentication requests when the matching score for the transaction is less than the matching score at the time the recommendation or alert was transmitted, or after a threshold number of recommendations or alerts have been issued to the credential owner.

For a more dramatic difference in the matching score (e.g., a difference that exceeds a certain threshold) or for a matching score below a threshold level, the ICA computing device 102 may be configured to determine that a fraud attempt is occurring. The ICA computing device 102 can return a result that the authentication is unsuccessful, and can additionally transmit a fraud alert to a third party (e.g., the issuing party associated with the identity credential) or the credential owner, using stored (verified) contact information. The ICA computing device 102 stores (e.g., in the container file) a transaction record including the matching score and the fraud alert. Where the ICA computing device 102 retrieves an NFT for an identity credential 200 that includes a previous fraud alert, the ICA computing device 102 may automatically decline the authentication request and/or transmit further fraud alert(s), without proceeding with any matching processes, which may conserve computer processing resources that would otherwise be expended on matching.

In some embodiments, the authentication transaction is completed based on the outcome of the biometric checking stage 334. Authentication of the presented identity credential 200 may enable various other processes. For example, the credential owner may be granted physical access to a physical location or digital access to digital content. As another example, authentication of the identity credential 200 enables the credential owner to use the identity credential 200 in a particular instance, such as within a digital wallet app.

In some embodiments, when the biometric checking stage 334 is successful, the authentication transaction proceeds to a third stage, referred to as a level checking stage 336. The level checking stage 336 may be implemented where the authentication request is initiated by a third party service provider, requesting the ICA computing device 102 to authenticate an identity credential 200 that has been presented to the third party service provider. The ICA computing device 102 executes a third smart contract (also referred to as a "level-of detail (LOD) contract") to select different levels of enrollment and/or identification data (e.g., PII) to present for different services and to issue a limited granted access to the service provider requesting authentication. For example, if a service provider only requires a certain age threshold (e.g., for a purchase of age-restricted goods), the ICA computing device 102 may return a result indicating the authentication was successful, as well as an "age verified" indicator.

Figure 7:
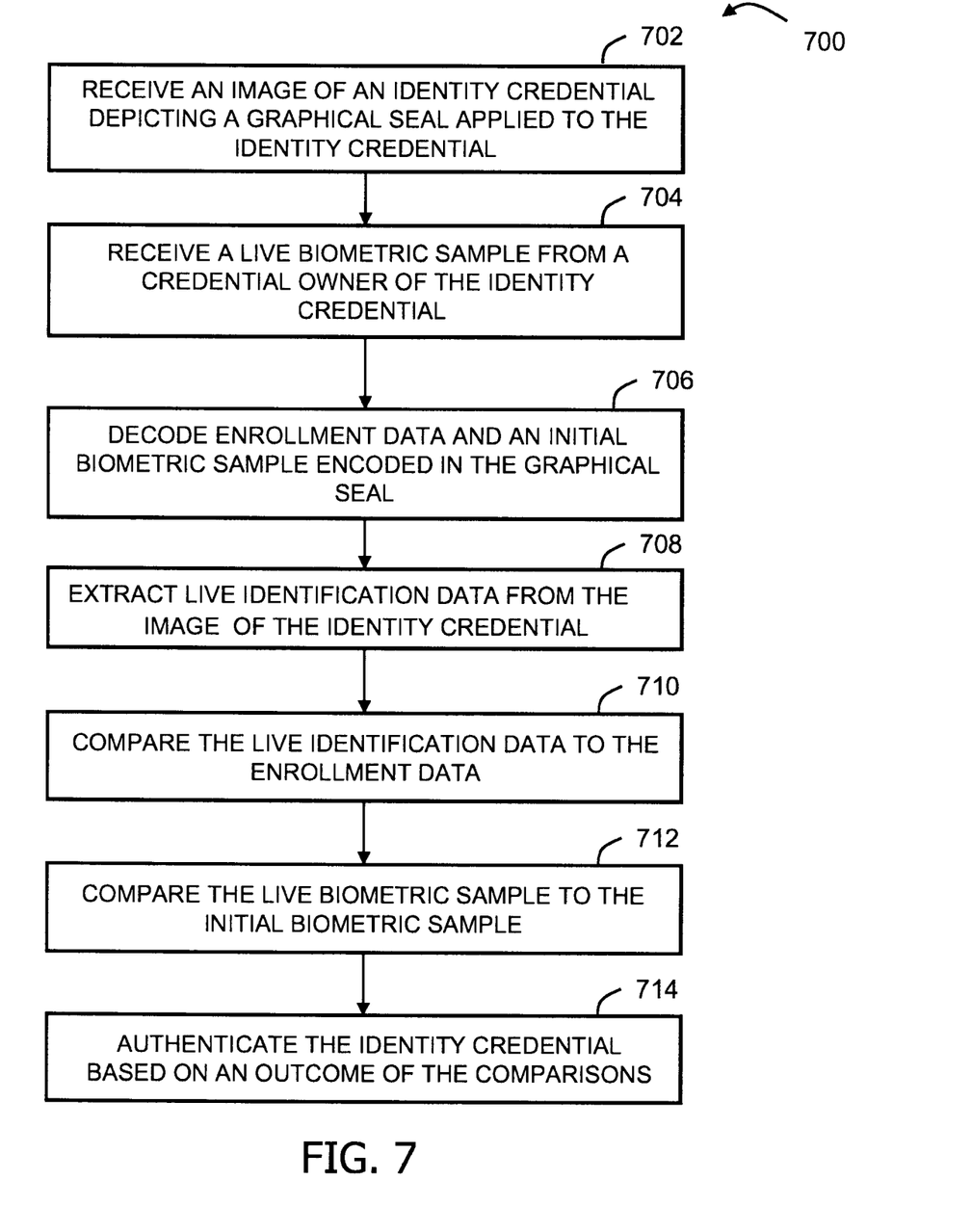
FIG. 7 is a flow diagram of a method of authenticating an identity credential.

FIG. 7 is a flow diagram of a method 700 of authenticating an identity credential in accordance with the present disclosure. Method 700 may be implemented using the credential authentication system 100 shown in FIG. 1, such as by the ICA computing device 102.

Method 700 includes receiving 702 an image of an identity credential presented for authentication, the image of the identity credential depicting a graphical seal applied to the identity credential, as well as receiving 704 a live biometric sample from a credential owner of the identity credential. Method 700 also includes decoding 706 enrollment data and an initial biometric sample encoded in the graphical seal, and extracting 708 live identification data from the image of the identity credential.

Method 700 further includes comparing 710 the live identification data to the enrollment data, comparing 712 the live biometric sample to the initial biometric sample, and authenticating 714 the identity credential based on an outcome of the comparisons.

Method 700 may include additional, fewer, and/or alternative steps.

In some embodiments, the data encoded in the graphical seal includes a link to a container file stored on a blockchain, and decoding 706 includes accessing the container file, and decrypting an NFT associated with the container file to access the enrollment data and initial biometric sample from the container file. In some embodiments, comparing 710 includes executing a first matching algorithm. In some instances, executing the first matching algorithm includes executing a first smart contract stored in the container file.

In some embodiments, comparing 712 includes executing a second matching algorithm. In some cases, executing the second matching algorithm includes executing a second smart contract stored in the container file. Method 700 may further include receiving a matching score output from the second matching algorithm, and updating the container file with the matching score.

In some embodiments, method 700 includes comparing the matching score to an authentication history for the identity credential stored in the container file, the authentication history including a time-series of matching scores from a corresponding series of previous authentication transactions of the identity credential.

In some cases, method 700 further includes identifying a gradually lowering trend by comparing the matching score to the authentication history, and generating an alert to the credential owner, the alert recommending renewal of the at least one of the identity credential and the initial biometric sample.

In some cases, method 700 further includes identifying a difference between the matching score and a most recent matching score in the authentication history, determining the difference exceeds a threshold, and generating a fraud alert.

Method 700 may include determining a level of access to provide to a requesting party upon authentication of the identity credential.

The systems and methods described herein may be implemented using computer programming or engineering techniques including computer software, firmware, hardware or any combination or subset thereof, wherein the technical effects and specific improvements to the technology and technical field may include one or more of: (i) improved accuracy of identity credential authentication; (ii) authentication processing that is device-agnostic and applicable across device variations; (iii) authentication of physical and digital identity credentials in a same way without conceding accuracy or robustness; (iv) linking physical and digital versions of an identity credential; (v) enabling ownership of the identity credential as a non-fungible biometric identification (NFBID) by an owner of the identity credential and use of the NFBID across applications; (vi) secure storage of biometric data that is retrievable during credential authentication; (vii) enabling authentication of an identity credential using smart contracts that automatically execute to perform matching or comparison functions; and (vii) maintaining a secure authentication scoring history that enables over-time monitoring of the success of authentication of an identity credential.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply that certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An identity credential authentication (ICA) computing device comprising a processor communicatively coupled to a memory, the ICA computing device configured to:
   receive enrollment data associated with an identity credential to be issued and an initial biometric sample associated with a credential owner of the identity credential;
   encrypt the received enrollment data and initial biometric sample;
   generate a graphical seal encoding the encrypted data;
   store the encrypted data in a storage location including a container file, wherein the storage location is accessible using the graphical seal;
   encrypt a plurality of matching algorithms for matching a live biometric sample and presented identification data to the initial biometric sample and enrollment data;
   store the encrypted matching algorithms in the container file;
   store a plurality of executable smart contracts for executing the plurality of matching algorithms in the container file;
   generate a non-fungible token (NFT) of the container file;
   initiate application of the graphical seal to the identity credential upon issuance of the identity credential, wherein the graphical seal is a digital seal for sealing a digital version of the identity credential; and
   generate the digital seal including an encoded link to the container file.

2. The ICA computing device of claim 1, further configured to generate the NFT of the container file with an ownership record indicating the credential owner is an owner of the identity credential upon issuance of the identity credential.

3. The ICA computing device of claim 1, further configured to generate the graphical seal including an expiration date of the graphical seal.

4. The ICA computing device of claim 1, further configured to initiate application of the graphical seal to a physical version of the identity credential as a physical graphical seal and to the digital version of the identity credential as a part of a digital credential file forming the digital version of the identity credential.

5. The ICA computing device of claim 4, wherein the graphical seal has a same appearance on the physical version of the identity credential and the digital version of the identity credential.

6. The ICA computing device of claim 1, further configured to initiate application of the graphical seal to the digital version of the identity credential by modifying an existing digital credential file forming the digital version of the identity credential.

7. The ICA computing device of claim 1, further configured to initiate application of the graphical seal to the digital version of the identity credential that corresponds to an existing physical version of the identity credential, by incorporating the graphical seal into a digital credential file forming the digital version of the identity credential.

8. An identity credential authentication (ICA) computing device comprising a processor communicatively coupled to a memory, the ICA computing device configured to:
   receive an image of an identity credential presented for authentication, the image of the identity credential depicting a graphical seal applied to the identity credential;
   receive a live biometric sample from a credential owner of the identity credential;
   decode a link to a container file stored on a blockchain, the link encoded in the graphical seal;
   decode enrollment data and an initial biometric sample encoded in the graphical seal by:
      accessing the container file; and
      decrypting an NFT associated with the container file to access the enrollment data and initial biometric seal from the container file;
   extract live identification data from the image of the identity credential;
   execute a first smart contract stored in the container file to execute a first matching algorithm that compares the live identification data to the enrollment data;
   execute a second smart contract stored in the container file to execute a second matching algorithm that compares the live biometric sample to the initial biometric sample; and
   authenticate the identity credential based on an outcome of the comparisons.

9. The ICA computing device of claim 8, further configured to:

receive a matching score output from the second matching algorithm; and update the container file with the matching score.

10. The ICA computing device of claim 9, further configured to compare the matching score to an authentication history for the identity credential stored in the container file, the authentication history including a time-series of matching scores from a corresponding series of previous authentication transactions of the identity credential.

11. The ICA computing device of claim 10, further configured to:
   identify a gradually lowering trend by comparing the matching score to the authentication history; and
   generate an alert to the credential owner, the alert recommending renewal of the at least one of the identity credential and the initial biometric sample.

12. The ICA computing device of claim 10, further configured to:
   identify a difference between the matching score and a most recent matching score in the authentication history;
   determine the difference exceeds a threshold; and
   generate a fraud alert.

13. The ICA computing device of claim 8, further configured to determine a level of access to provide to a requesting party upon authentication of the identity credential.

14. The ICA computing device of claim 5, wherein the identity credential is one of: (i) a physical identity credential being physically presented for authentication, or (ii) a digital identity credential being displayed on a user computing device of the credential owner.

* * * * *